(12) United States Patent
Smith

(10) Patent No.: US 8,015,221 B1
(45) Date of Patent: Sep. 6, 2011

(54) SYSTEMS AND METHODS FOR MAINTAINING FILE-TYPE INFORMATION

(75) Inventor: Spencer Smith, El Segundo, CA (US)

(73) Assignee: Symantec Corporation, Mountain View, CA (US)

( * ) Notice: Subject to any disclaimer, the term of this patent is extended or adjusted under 35 U.S.C. 154(b) by 347 days.

(21) Appl. No.: 12/268,256

(22) Filed: Nov. 10, 2008

(51) Int. Cl.
*G06F 17/30* (2006.01)

(52) U.S. Cl. .................. 707/825; 707/999.203

(58) Field of Classification Search ............ 707/634, 707/821, 999.1, 999.205, 825, 999.01, 999.203; 715/217
See application file for complete search history.

(56) References Cited

U.S. PATENT DOCUMENTS

2005/0234858 A1* 10/2005 Torii et al. ................ 707/1
2008/0040388 A1* 2/2008 Petri et al. ............. 707/104.1

* cited by examiner

*Primary Examiner* — Marc Filipczyk

(74) *Attorney, Agent, or Firm* — Holland & Hart LLP

(57) ABSTRACT

A method for maintaining file-type information for a file is described. Data in a first position of a file is analyzed. A file-type for the file is determined based on the analyzed data in the first position. The file is monitored for input/output operations. The file-type of the file is updated if input/output operations occur within the first position of the file.

17 Claims, 6 Drawing Sheets

SYSTEMS AND METHODS FOR MAINTAINING FILE-TYPE INFORMATION

BACKGROUND

The use of computer systems and computer-related technologies continues to increase at a rapid pace. This increased use of computer systems has influenced the advances made to computer-related technologies. Indeed, computer systems have increasingly become an integral part of the business world and the activities of individual consumers. Computer systems are used to carry out several business, industry, and academic endeavors. For example, computer systems are used to complete transactions, store data, provide information, etc.

Data used by a computer system may be organized into a computer file. The data may be represented as a collection of binary digits that represent integer values, text characters, etc. A computer program may access a computer file, interpret the contents of the file, and present the contents to a user as more meaningful information (text, images, sounds, etc.)

The number of computer files that may be stored in a given computer system may be extremely large. Techniques may be used to organize the large quantity of computer files. The files (or links to the files) may be located in directories. For example, a directory may include either a list of files or a list of links to files. These lists may be organized according to the name of a file, the type of a file, the size of a file, etc.

Computer systems may also take precautions to prevent a malicious computer file from being activated (i.e., opened). The activation of a malicious file may damage or destroy other data, files, etc. stored in the computer system. Computer systems may analyze certain characteristics associated with a computer file in order to determine if the file is a malicious file. As such, benefits may be realized by providing improved systems and methods for monitoring computer files. In particular, benefits may be realized by providing improved systems and methods for maintaining file-type information for a file.

SUMMARY

According to at least one embodiment, a method for maintaining file-type information for a file is described. Data in a first position of a file is analyzed. A file-type for the file is determined based on the analyzed data in the first position. The file is monitored for input/output operations. The file-type of the file is updated if input/output operations occur within the first position of the file.

In one embodiment, the file-type for the file may be stored in a database. The file-type position information for the file may also be stored in a database. File-type algorithms may be provided to determine the file-type of the file. The file-type algorithms may include file-type position information to indicate the position of a file-type indicator within the file.

In one embodiment, the input/output operation may be a write operation to the file. In another embodiment, the input/output operation may be a read operation to the file. In one configuration, the first position of the file may be a header of the file. The file-type of the file may be provided to a component through a reporting interface.

A computer system that is configured to maintain file-type information for a file is also described. The computer system may include a processor and memory in electronic communication with the processor. The computer system may also include a file-type module. The module may be configured to analyze data in a first position of a file and determine a file-type for the file based on the analyzed data in the first position. In addition, the file-type module may be configured to monitor the file for input/output operations and update the file-type of the file if input/output operations occur within the first position of the file.

A computer-program product for maintaining file-type information for a file is also described. The computer-program product may include a computer-readable medium having instructions thereon. The instructions may include code programmed to analyze data in a first position of a file and code programmed to determine a file-type for the file based on the analyzed data in the first position. In addition, the instructions may include code programmed to monitor the file for input/output operations and code programmed to update the file-type of the file if input/output operations occur within the first position of the file.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
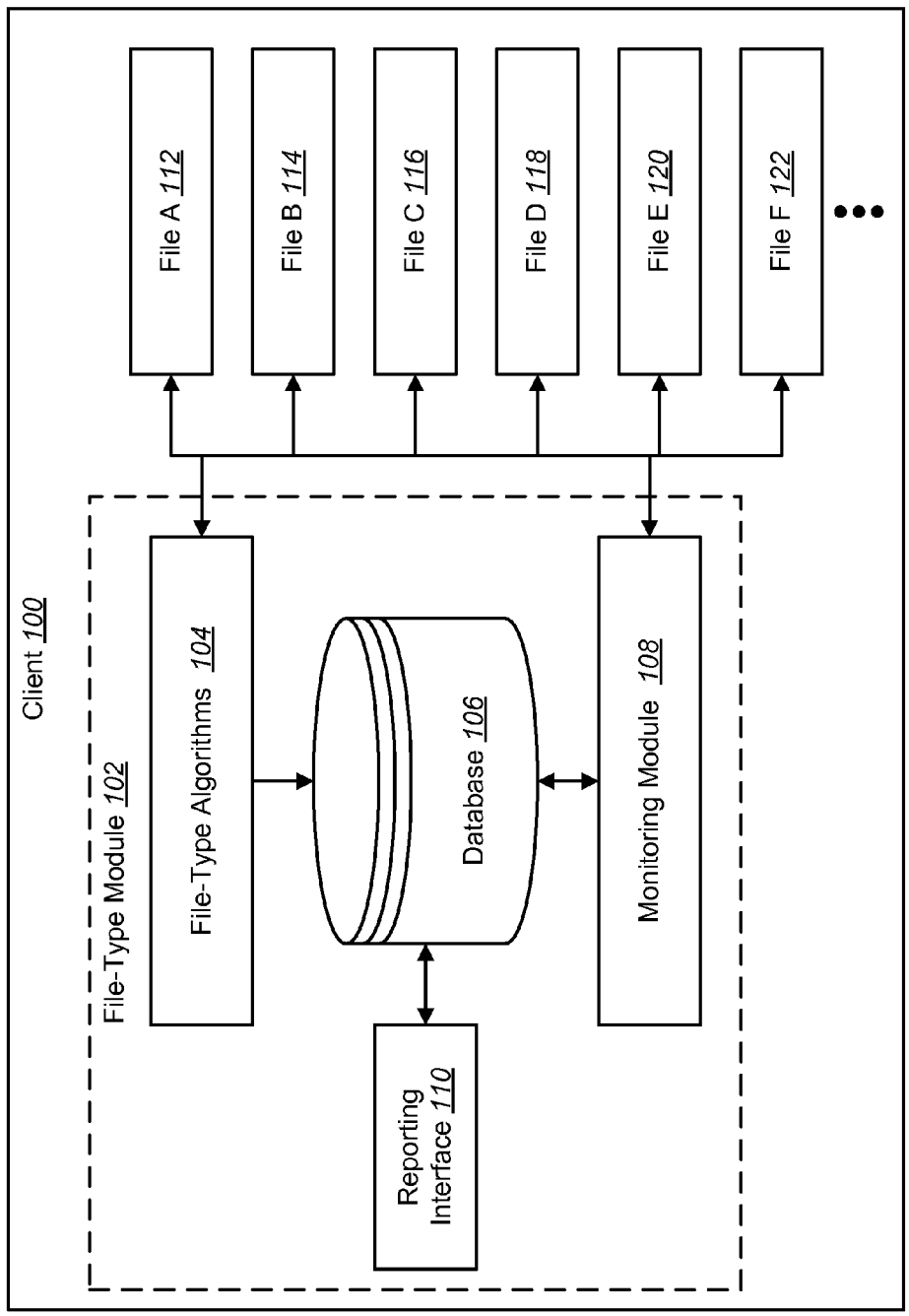
FIG. 1 is a block diagram illustrating one embodiment of a client computing device.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Computer systems may implement security software to protect the hardware and software of the computer system from malicious applications, files, etc. In one embodiment, security products installed on a computer system determine the type of a file in order to evaluate the level of threat the file may pose to the computer system. The file-type may also be used to determine the level of scrutiny that may be necessary before a file is classified as a non-malicious file.

Currently, security products perform file typing activity as a step in the analysis of a file when the file is scanned. The file-type information may be persisted as long as a file is not modified. However, if the file is modified, pre-existing file-type information is discarded and the file-type is re-calculated during the next scan operation. In other words, except for files that are seldom modified, the file typing activity is performed over and over again. Performing multiple file typing activities for a file may be costly for on-demand file scans where a scan could be skipped or truncated if the file-type is known in advance. If file typing activity takes place, file system input/output (I/O) occurs, which is often the most expensive portion of an on-demand file scan. The present systems and methods maintain a file's type throughout the life of the file without requiring additional I/O on the file. Maintaining the file-type of a file leads to performance gains for a system when scanning and decomposing files are performed in on-demand file scans.

FIG. 1 is a block diagram illustrating one embodiment of a client 100. The client may be a computing device, such as a laptop, personal digital assistant (PDA), hand-held computer, desktop computer, super-computer, or any other type of computing device. In one embodiment, the client 100 includes a file-type module 102. The file-type module 102 may analyze files 112-122 that may be stored in the client 100. In one configuration, the file-type module 102 may analyze the files 112-122 in order to determine a file-type associated with each file 112-122. For example, the file-type module 102 may analyze file A 112 and determine that file A 112 is an executable file-type, a text file-type, etc.

In one embodiment, the file-type module 102 may include one or more components in order to determine a file-type for files 112-122 stored within the client 100. For example, the file-type module 102 may include file-type algorithms 104. The file-type algorithms 104 may be a set of rules that may be data driven. In one embodiment, the file-type algorithms 104 may include information about how to determine the file-type of a particular file. In other words, the file-type algorithms 104 may indicate a position within a file that includes file-type markers or indicators. For example, the file-type algorithms 104 may indicate that the header of the file includes file-type markers that indicate the file-type.

In one embodiment, the file-type module 102 may also include a database 106 that stores the file-type associated with each file 112-122. The file-type module 102 may include a monitoring module 108. In one embodiment, the monitoring module 108 monitors files 112-122 stored within the client 100 and updates the file-type for each monitored file. For example, the monitoring module 108 updates the file-types stored within the database 106.

The file-type module 102 may further include a reporting interface 110. The reporting interface 110 may facilitate additional components of the client 100 to retrieve the stored file-type information from the database 106. More details regarding the file-type module 102 and its components will be discussed below.

Figure 2:
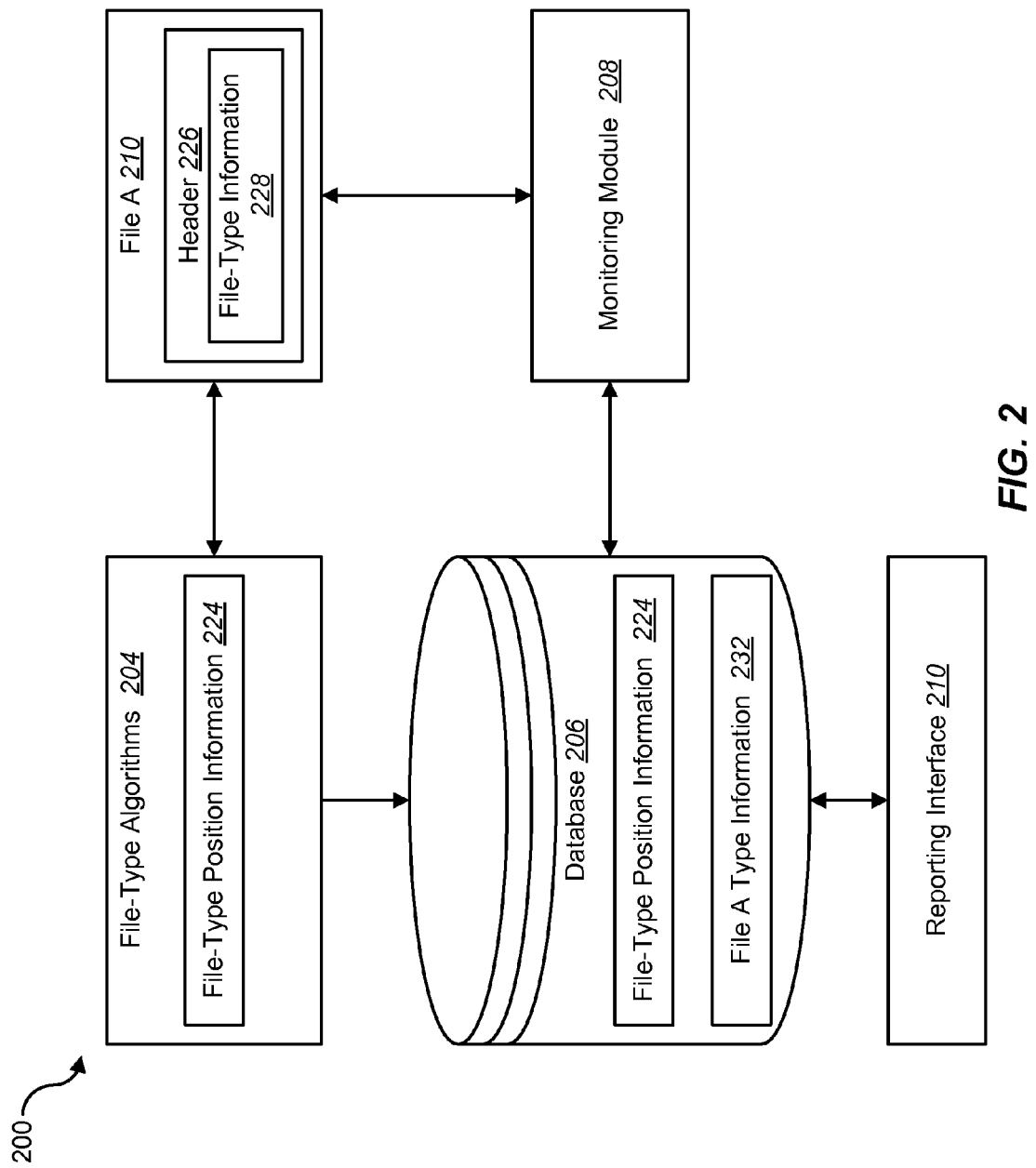
FIG. 2 is a block diagram illustrating one embodiment of a file-type module.

FIG. 2 is a block diagram illustrating a further embodiment of the file-type module 202. In one configuration, file-type algorithms 204 analyze a file stored within the client 100. For example, the file-type algorithms 204 may analyze file A 210. The file-type algorithms 204 may include file-type position information 224 that may indicate the position within file A 210 that includes file-type information 228. In one example, the file-type position information 224 may indicate that a header 226 of file A 210 includes the file-type information 228. In one embodiment, the file-type algorithms 204 may analyze the file-type information 228 within the header 226 in order to determine the file-type of file A 210.

A database 206 may be used to store the file-type position information 224 and the file-type information 232 associated with file A 210. In other words, the database 206 may store position information 224 that indicates where in file A 210 the file-type information 228 may be found. The determined file-type of file A 210 may be stored in the database 206 as file A type information 232.

In one configuration, a monitoring module 208 may monitor input/output commands executed on file A 210. For example, the monitoring module 208 may monitor file A 210 for write commands executed on the file 210. The monitoring module 208 may monitor for input/output operations executed in an area of file A 210 identified by the file-type position information 224. In one embodiment, the monitoring module 208 may update the file-type information 232 stored in the database 206 if an input/output operation is detected in the area of file A 210 identified by the file-type position information 224. For example, the monitoring module 208 may detect a write operation in the header 226 of file A 210. The write operation may modify file A 210. The monitoring module 208 may update or maintain the file-type information 232 for file A 210 depending on the modification to the header 226 of file A 210.

In one example, the reporting interface 210 may retrieve file-type information 232 in order to report this information 232 to other components of the client 100. In one embodiment, the information 232 may be reported to a file scanning system. For example, when a file is to be scanned (either on demand or in a real-time system), the file scanning system may interact with the reporting interface 210 to receive the file-type information 232 in order to determine the file-type of the file. The file scanning system may determine if a file of that file-type needs to be scanned, the extent to which the file needs to be scanned, whether the file needs to be decomposed, etc.

In one embodiment, the information 232 may be reported to a tracking system that tracks the creation of executable files in order to maintain lineage information. For example, the tracking system may determine the point at which a file has been closed and request the file-type information 232 from the reporting interface 210. This may eliminate the need for the tracking system to open the file and perform additional I\O in order to determine whether the file is executable.

In another embodiment, a searching system may interact with the reporting interface 210 to receive the file-type information 232. The searching system may search for all files of a specific file-type. For example, a user may use the searching system to locate all the Joint Photographic Experts Group (JPEG) files on the client 100. In one embodiment, the searching system may use the reporting interface 210 to retrieve a list of all the JPEG files on the client 100 instead of scanning the entire disk to locate such files.

Figure 3:
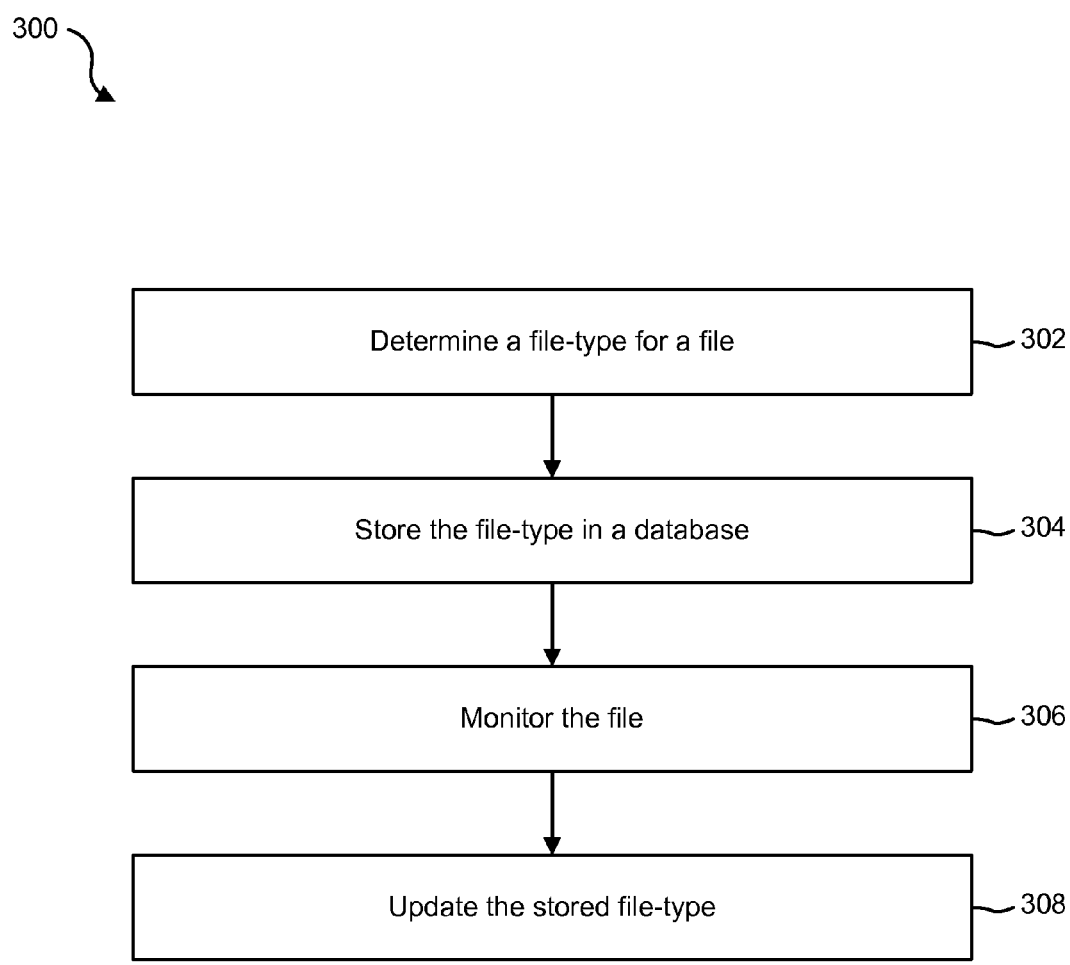
FIG. 3 is a flow diagram illustrating one embodiment of a method for maintaining a determined file-type of a file.

FIG. 3 is a flow diagram illustrating one embodiment of a method 300 for maintaining the file-type of a file. In one embodiment, the method 300 may be implemented by the file-type module 102.

In one configuration, a file-type for a file may be determined 302. The file may be stored within the client 100. In one embodiment, the file-type algorithms 104 may be used to determine the file-type of the file. In one example, the determined file-type may be stored 304 in a database. The file may be monitored 306. For example, the file may be monitored 306 for input/output operations to the file. In one embodiment, the file may be monitored 306 for changes or updates to the file that may modify the file-type. In one embodiment, the stored file-type in the database may be updated 308. The updated file-type may replace the previously stored file-type in the database.

Figure 4:
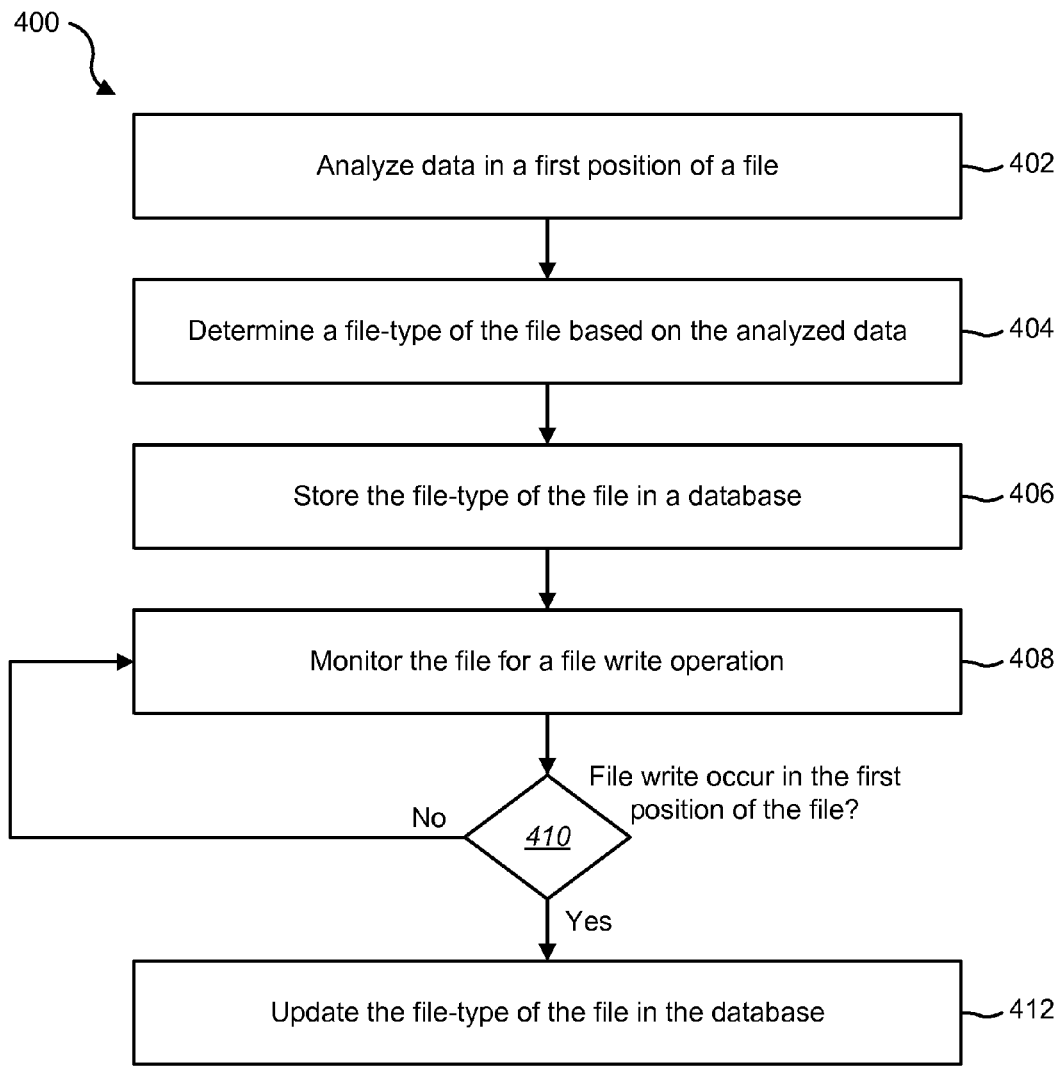
FIG. 4 is a flow diagram illustrating one embodiment of a method for maintaining a determined file-type of a file through intercepted Input/Output (I/O) operations to the file.

FIG. 4 is a flow diagram illustrating one embodiment of a method 400 for maintaining the file-type of a file through intercepted input/output (I/O) operations to the file. In one configuration, the method 400 may be implemented by the file-type module 102.

In one configuration, data in a first position of a file may be analyzed 402. The first position of the file may be the header of the file or some other location. In one embodiment, the file-type of a file may be determined 404 based on the analyzed data. For example, data in a header of a file may be analyzed in order to determine 404 the file-type of the file. In one configuration, the determined file-type may be stored 406 in a database. The file may then be monitored 408 for a file write operation. In another embodiment, the file may be monitored 408 for other I/O operations to the file.

A determination 410 may be made as to whether the file write operation occurred in the first position of the file. If it is determined 410 that the file write did not occur in the first position of the file, the file may continue to be monitored 408 for a file write operation. However, if it is determined 410 that the file write occurred in the first position of the file, the file-type of the file may be updated 412 in the database. In other words, the file-type may be maintained throughout the life of the file without performing another scan of the file if the file is modified or accessed.

Figure 5:
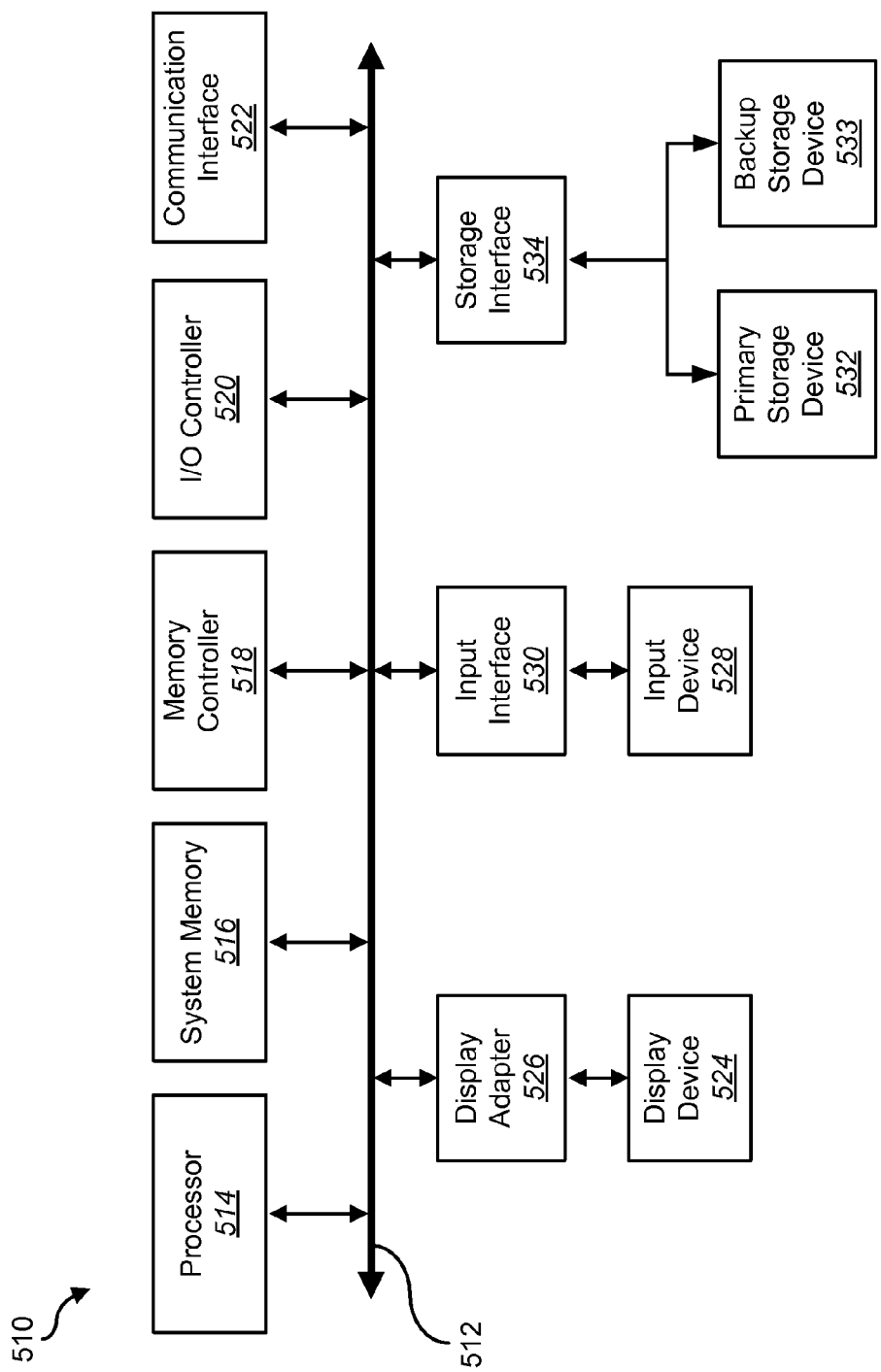
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may comprise at least one processor 514 and system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein. For example, processor 514 may perform and/or be a means for performing, either alone or in combination with other elements, one or more of the analyzing, determining, monitoring, and updating steps described herein. Processor 514 may also perform and/or be a means for performing any other steps, methods, or processes described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may comprise both a volatile memory unit (such as, for example, system memory 516) and a non-volatile storage device (such as, for example, primary storage device 532, as described in detail below).

In certain embodiments, exemplary computing system 510 may also comprise one or more components or elements in addition to processor 514 and system memory 516. For example, as illustrated in FIG. 5 computing system 510 may comprise a memory controller 518, an I/O controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512. In certain embodiments, memory controller 518 may perform and/or be a means for performing, either alone or in combination with other elements, one or more of the steps or features described and/or illustrated herein, such as analyzing, determining, monitoring, and updating.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534. I/O controller 520 may be used, for example, to perform and/or be a means for analyzing, determining, monitoring, and updating steps described herein. I/O controller 520 may also be used to perform and/or be a means for performing other steps and features set forth in the instant disclosure.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network comprising additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network or a wireless IEEE 802.11 network), a personal area network (such as a BLUETOOTH or IEEE Standard 802.15.1-2002 network), a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution. In certain embodiments, communication interface 522 may perform and/or be a means for performing, either alone or in combination with other elements, one or more of the analyzing, determining, monitoring, and updating steps disclosed herein. Communication interface 522 may also be used to perform and/or be a means for performing other steps and features set forth in the instant disclosure.

As illustrated in FIG. 5, computing system 510 may also comprise at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also comprise at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device. In at least one embodiment, input device 528 may perform and/or be a means for performing, either alone or in combination with other elements, one or more of the analyzing, determining, monitoring, and updating steps disclosed herein. Input device 528 may also be used to perform and/or be a means for performing other steps and features set forth in the instant disclosure.

As illustrated in FIG. 5, exemplary computing system 510 may also comprise a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also comprise other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Storage devices 532 and 533 may also be used, for example, to perform and/or be a means for performing, either alone or in combination with other elements, one or more of the analyzing, determining, monitoring, and updating steps disclosed herein. Storage devices 532 and 533 may also be used to perform and/or be a means for performing other steps and features set forth in the instant disclosure.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
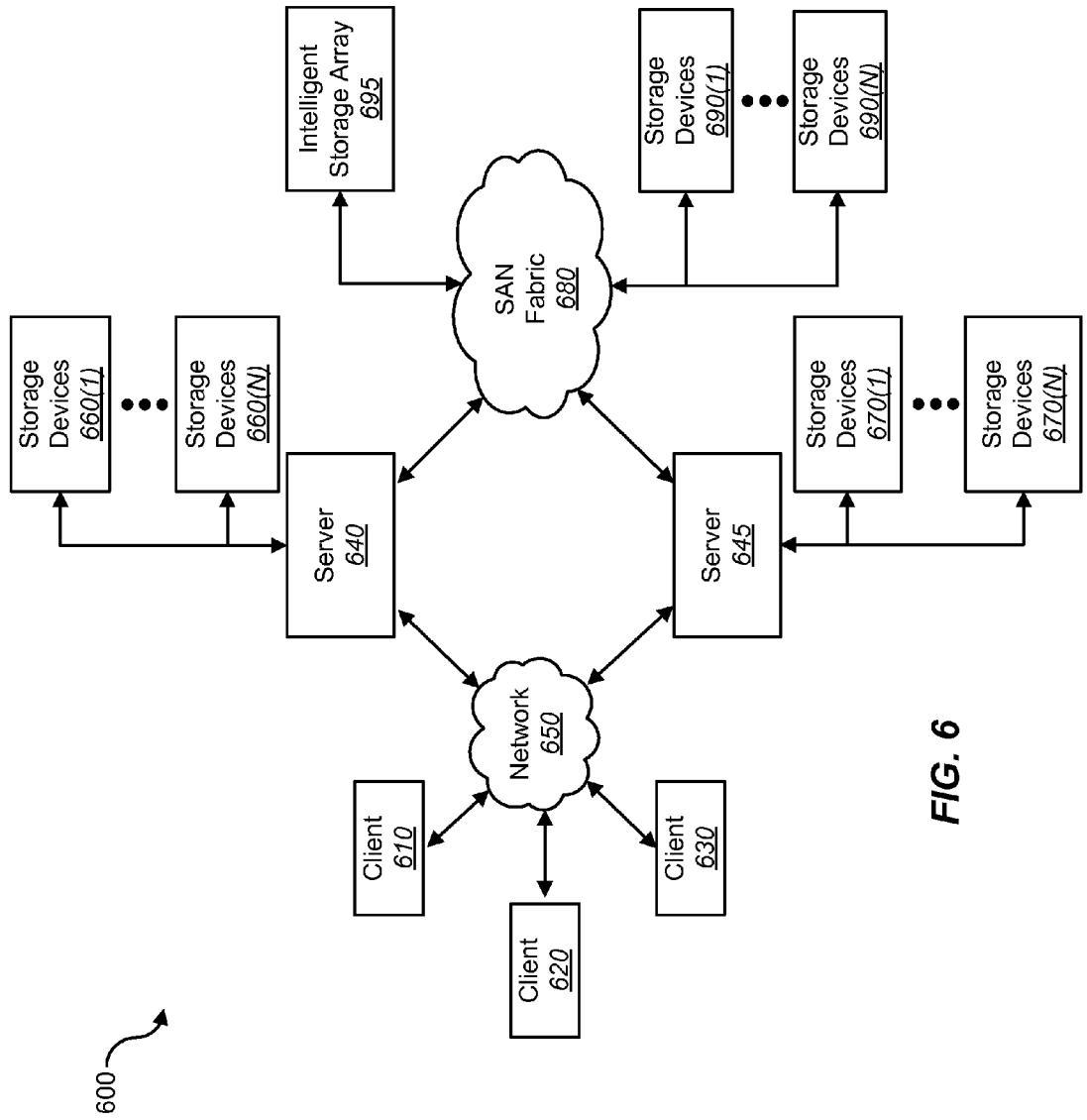
FIG. 6 is a block diagram of one embodiment of a network architecture in which the present systems and methods may be implemented.

FIG. 6 is a block diagram of an exemplary network architecture 600 in which client systems 610, 620, and 630 and servers 640 and 645 may be coupled to a network 650. Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or to run certain software applications. Network 650 generally represents any telecommunication or computer network; including, for example, an intranet, a wide area network (WAN), a local area network (LAN), a personal area network (PAN), or the Internet.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 780 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690 (1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650. Accordingly, network architecture 600 may perform and/or be a means for performing, either alone or in combination with other elements, one or more of the analyzing, determining, monitoring, and updating steps disclosed herein. Network architecture 600 may also be used to perform and/or be a means for performing other steps and features set forth in the instant disclosure.

As detailed above, computing system 510 and/or one or more of the components of network architecture 600 may perform and/or be a means for performing, either alone or in combination with other elements, one or more steps of the exemplary methods described and/or illustrated herein. For example, computing system 510 and/or one or more of the components of network architecture 600 may perform and/or be a means for performing a computer-implemented method for maintaining file-type information for a file that may comprise: 1) analyzing data in a first position of a file, 2) determining a file-type for the file based on the analyzed data in the first position, 3) monitoring the file for input/output operations, and 4) updating the file-type of the file if input/output operations occur within the first position of the file.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A method for maintaining file-type information for a file, the method comprising:
analyzing, by a processor of a computing device, data in a first position of a file, wherein the first position comprises a header of the file;
determining, by the processor, a file-type for the file based on the analyzed data in the first position;
storing file-type information for the file in a database;
monitoring, by the processor, the file for input/output operations;
identifying, by the processor, a modification to the data in the first position from the input/output operations;
determining whether the modification to the data satisfies a predetermined threshold;
maintaining, by the processor, the file-type for the file when the modification to the data in the first position does not satisfy the predetermined threshold, wherein maintaining the file-type comprises preserving the file-type information previously stored in the database and preventing the data in the first position from being re-analyzed to determine the file-type for the file; and updating, by the processor, the file-type of the file when input/output operations occur within the first position of the file and the modification to the data in the first position satisfies the predetermined threshold.

2. The method of claim 1, further comprising providing file-type algorithms to determine the file-type of the file.

3. The method of claim 2, wherein the file-type algorithms comprise file-type position information to indicate the position of a file-type indicator within the file.

4. The method of claim 3, further comprising storing the file-type position information for the file in a database.

5. The method of claim 1, wherein the input/output operation comprises a write operation to the file.

6. The method of claim 1, further comprising providing the file-type of the file to a component through a reporting interface.

7. The method of claim 1, wherein updating the file-type of the file comprises discarding the file-type information for the file previously stored in the database.

8. The method of claim 7, further comprising re-analyzing the data in the first position of the file to determine the file-type for the file.

9. The method of claim 8, wherein re-analyzing the data comprises scanning the header of the file to identify file-type markers that indicate the file-type for the file.

10. The method of claim 8, further comprising storing the newly determined file-type for the file in the database.

11. A computer system that is configured to maintain file-type information for a file, the computer system comprising:
 a processor;
 memory in electronic communication with the processor; and
 a file-type module, the module configured to:
  analyze data in a first position of a file, wherein the first position comprises a header of the file;
  determine a file-type for the file based on the analyzed data in the first position;
  store file-type information for the file in a database;
  monitor the file for input/output operations;
  identify a modification to the data in the first position from the input/output operations;
  determine whether the modification to the data satisfies a predetermined threshold;
  maintain the file-type of the file when the modification to the data in the first position does not satisfy the predetermined threshold, wherein maintaining the file-type comprises preserving the file-type information previously stored in the database and preventing the data in the first position from being re-analyzed to determine the file-type for the file; and
  update the file-type of the file when input/output operations occur within the first position of the file and the modification to the data in the first position satisfies the predetermined threshold.

12. The computer system of claim 11, wherein the file-type module comprises file-type algorithms configured to determine the file-type of the file.

13. The computer system of claim 12, wherein the file-type algorithms comprise file-type position information to indicate the position of a file-type indicator within the file.

14. The computer system of claim 11, wherein the input/output operation comprises a write operation to the file.

15. The computer system of claim 11, wherein the file-type module is further configured to store the file-type position information for the file in a database.

16. The computer system of claim 11, wherein the file-type module is further configured to provide the file-type of the file to a component through a reporting interface.

17. A computer-program product for maintaining file-type information for a file, the computer-program product comprising a non-transitory computer-readable medium having instructions thereon, the instructions comprising:
 code programmed to analyze data in a first position of a file, wherein the first position comprises a header of the file;
 code programmed to determine a file-type for the file based on the analyzed data in the first position;
 code programmed to store file-type information for the file in a database;
 code programmed to monitor the file for input/output operations;
 code programmed to identify a modification to the data in the first position from the input/output operations;
 code programmed to determine whether the modification to the data satisfies a predetermined threshold;
 code programmed to maintain the file-type of the file when the modification to the data in the first position does not satisfy the predetermined threshold, wherein maintaining the file-type comprises preserving the file-type information previously stored in the database and preventing the data in the first position from being re-analyzed to determine the file-type for the file; and
 code programmed to update the file-type of the file when input/output operations occur within the first position of the file and the modification to the data in the first position satisfies the predetermined threshold.

* * * * *